United States Patent
Hervé

(10) Patent No.: US 6,175,179 B1
(45) Date of Patent: Jan. 16, 2001

(54) ASSEMBLY OF A COLLECTING HOUSING AND A REDUCING MOTOR CONNECTOR

(75) Inventor: Laurandel Hervé, Damozane (FR)

(73) Assignee: Meritor Light Vehicle Systems France (FR)

(*) Notice: Under 35 U.S.C. 154(b), the term of this patent shall be extended for 0 days.

(21) Appl. No.: 09/180,693

(22) PCT Filed: May 13, 1997

(86) PCT No.: PCT/FR97/00849

§ 371 Date: Jul. 26, 1999

§ 102(e) Date: Jul. 26, 1999

(87) PCT Pub. No.: WO97/43819

PCT Pub. Date: Nov. 20, 1997

(30) Foreign Application Priority Data

May 13, 1996 (FR) .................................. 96 05 923

(51) Int. Cl.[7] .................. H01R 39/08; H01R 39/44; H01R 39/40; H01R 39/38

(52) U.S. Cl. .................. 310/232; 310/229; 310/246; 310/244

(58) Field of Search ................. 310/89, 229, 230, 310/232, 219, 246, 245, 244, 239, 241; 318/292, 541, 542; 322/53, 54, 55, 56

(56) References Cited

U.S. PATENT DOCUMENTS

| 4,581,499 | * | 4/1986 | Cousins | ................. 200/1 V |
| 5,204,565 | * | 4/1993 | Sekine et al. | ............ 310/71 |

* cited by examiner

*Primary Examiner*—Nestor Ramirez
*Assistant Examiner*—Guillermo Perez
(74) *Attorney, Agent, or Firm*—Carlson, Gaskey & Olds

(57) ABSTRACT

A motorized reduction gear includes a slip-ring housing having a pivot and a ramp to guide a spring slidably fitted on the pivot as far as its base. The ramp is preferably formed on a boss of the slip-ring housing which extends on each side of the associated pivot and partially surrounds it. In a final position, one branch forces a brush against the slip ring and the other branch bears against a slit at the foot of the ramp to provide an improved assembly that avoids soldering.

5 Claims, 4 Drawing Sheets

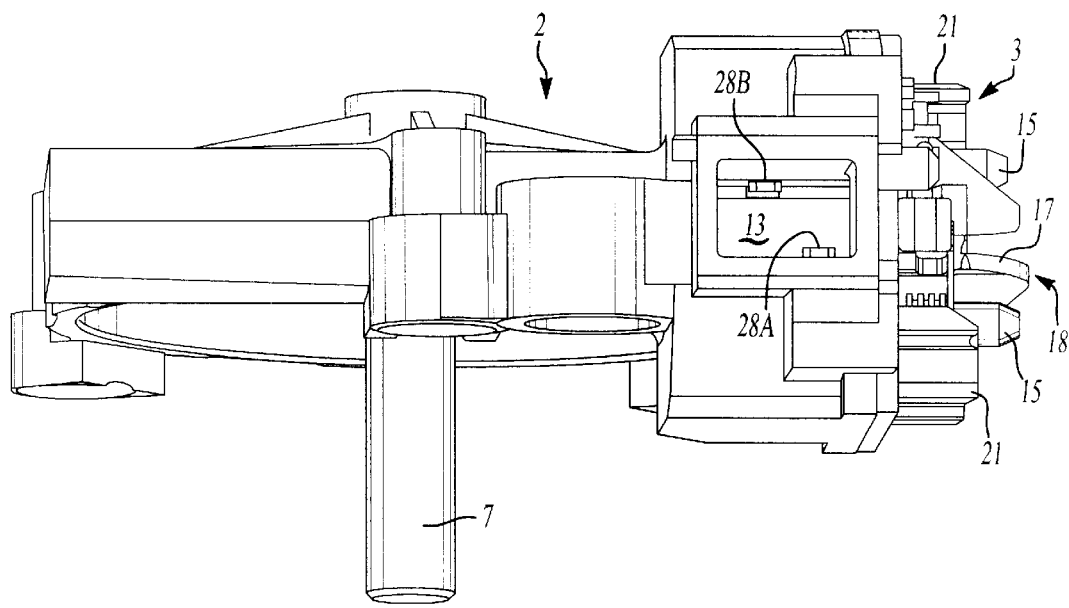
Fig-5
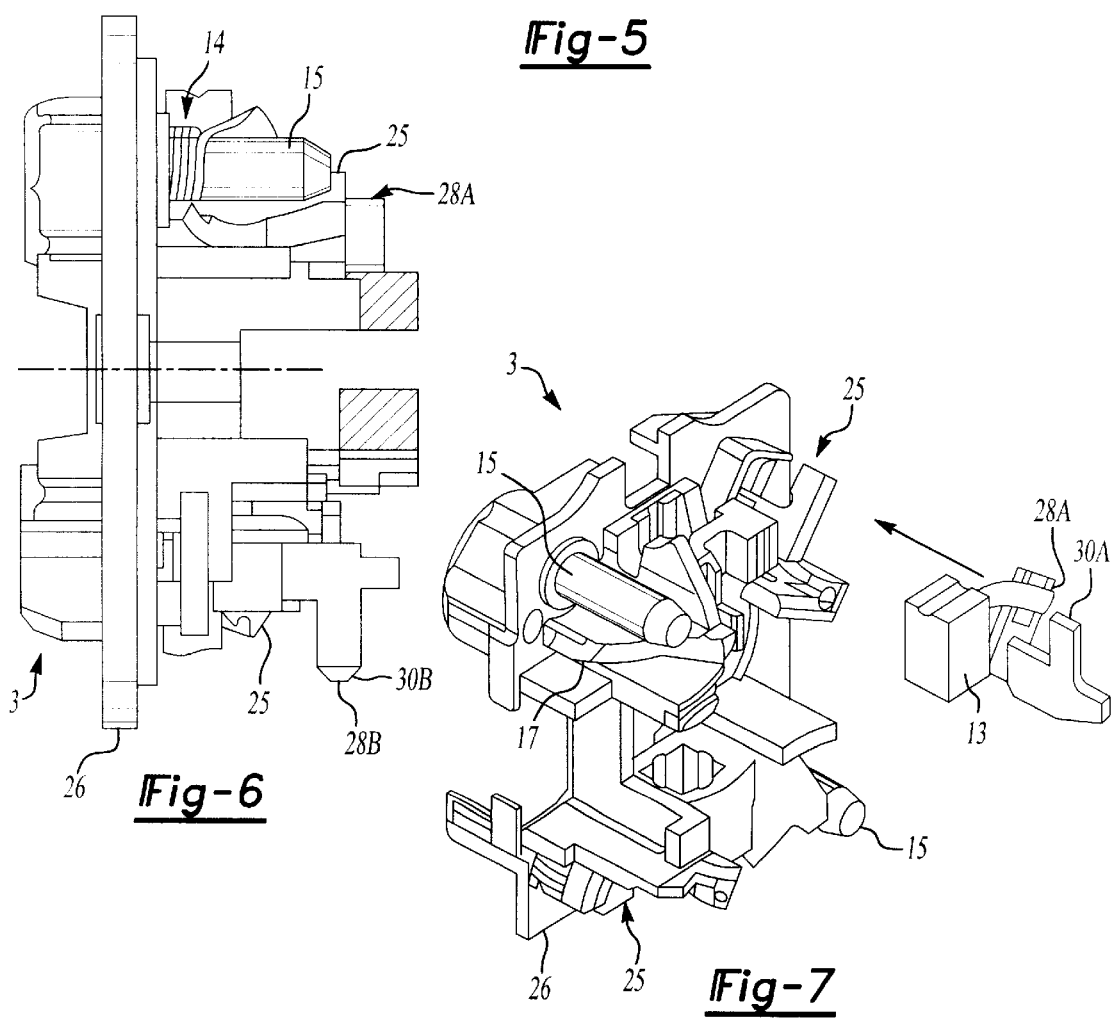
Fig-6
Fig-7

ASSEMBLY OF A COLLECTING HOUSING AND A REDUCING MOTOR CONNECTOR

BACKGROUND OF THE INVENTION

This invention relates generally to a motorized reduction gear assembly. More particularly, the present invention relates to an improved brush mounting assembly for electric motors used to drive vehicle windows, sunroofs, or adjustable seats.

Slip-ring housings manufactured hitherto have included a support housing, an electrical connection to which the braid of a brush is soldered, thermal protection, and multiple brush springs.

The slip-ring housing supports male electrical connectors which fit into female electrical connectors of the connector assembly. The slip-ring housing and connector assembly fitting into a well of the reduction gearbox. Typically, connections open into the well of the box to accommodate a fixed connector or loom, the ends of which are soldered to the connectors of the slip-ring housing.

Mounting the connector in the well, soldering leads to the brushes, and fitting of the brush springs are relatively complex procedures which results in a relatively high assembly cost,

SUMMARY OF THE INVENTION

In general terms, this invention includes a connector assembly which clips into corresponding shapes formed in the walls of the well of a reduction gear assembly. Preferably, the connector assembly includes female electrical connectors which engage male electrical connectors extending from a slip-ring housing. The slip-ring housing includes springs having two end branches to force corresponding brushes against the slip-ring The slip-ring housing further includes a pivot and a ramp to guide a spring slidably fitted on the pivot as far as its base. The ramp is preferably formed on a boss of the slip-ring housing, which extends on each side of the associated pivot and partially surrounds it. Arranged at the base of each ramp is a slit that houses and acts as stop for branches of the spring after the branches have been parted and guided along respective ramp. In the final position, one branch forces a brush against the slip ring and the other branch bears against the slit at the foot of the ramp.

Fitting of the connector assembly and mounting of springs according to the present invention provides for improved assembly that avoids the soldering hitherto employed.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a partial perspective view of the motorized reduction gear, taken from the same side as the well in the reduction gearbox and showing the flat connections of the slip-ring housing engaged in the well.

FIG. 6 is a view in side elevation of an alternative form of the slip-ring housing of FIGS. 3 and 2.

FIG. 7 is an exploded perspective view of the slip-ring housing of FIG. 6.

DETAILED DESCRIPTION OF THE PREFERRED EMBODIMENT

Figure 1:
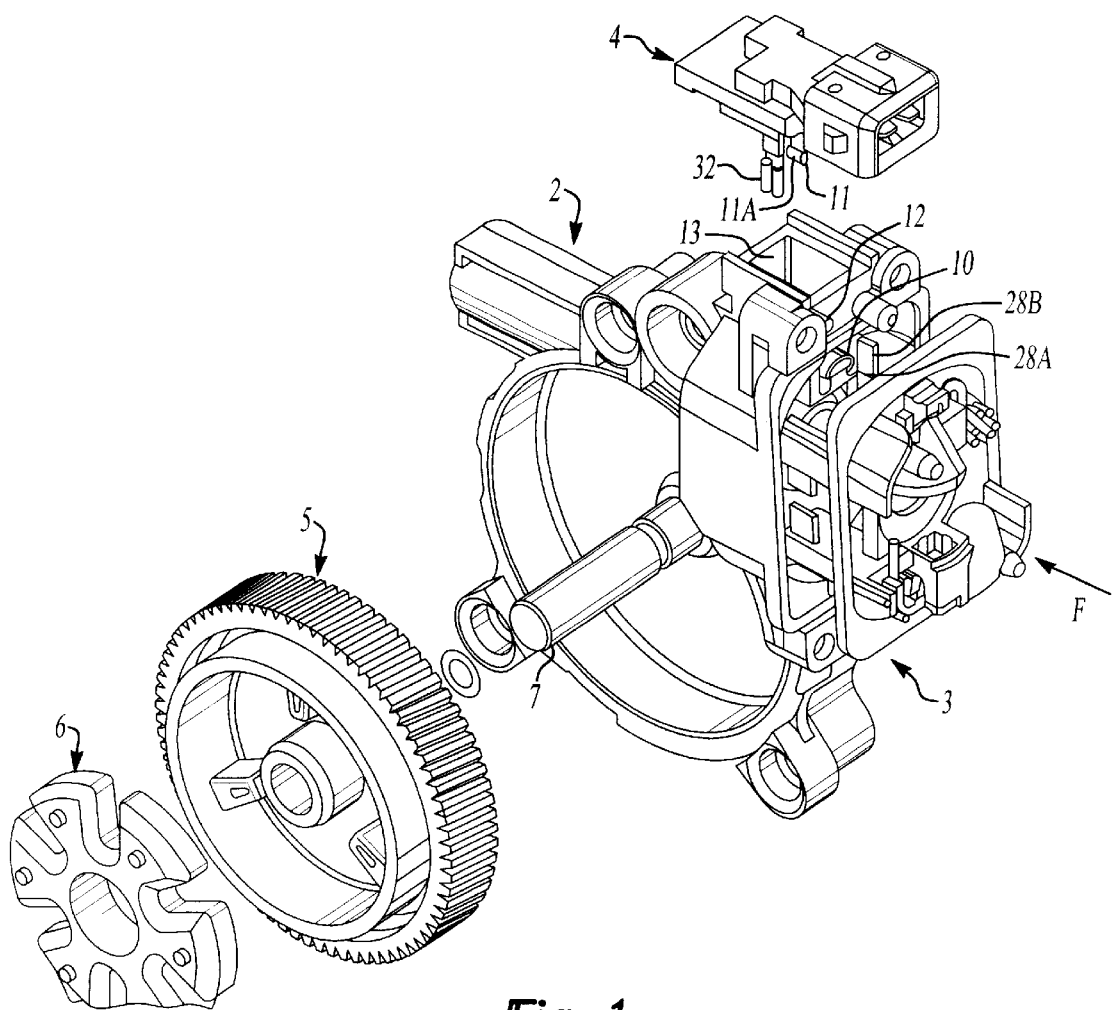
FIG. 1 is a partially exploded perspective view of a motorized reduction gear equipped with a connector according to the invention.

The present invention provides a motorized reduction gear assembly for powered vehicle accessories. The motorized reduction gear assembly generally includes a rotor 1, a reduction gearbox 2, a slip-ring housing 3, and a connector 4. The connector assembly 4, and output members being securable to the reduction gearbox 2. The output members including a gearwheel 5 and a damper 6 mounted coaxially with a shaft 7 borne by the box 2. Teeth of the wheel 5 are in mesh with an endless screw 8 of the shaft 9 of the rotor 3 (FIG. 2).

The slip-ring housing 3 fits into the reduction gearbox 2 in the direction of arrow F (FIG. 1). The flat male connectors 28a, 28b open into the well 13 inside two parallel grooves 10 made in the bottom of this well. The two female connectors 32 clip onto the two flat male connectors 28a, 28b. The connector assembly 4 being held on the box 2 by the mechanical clipping of the tabs 11.

Figure 2:
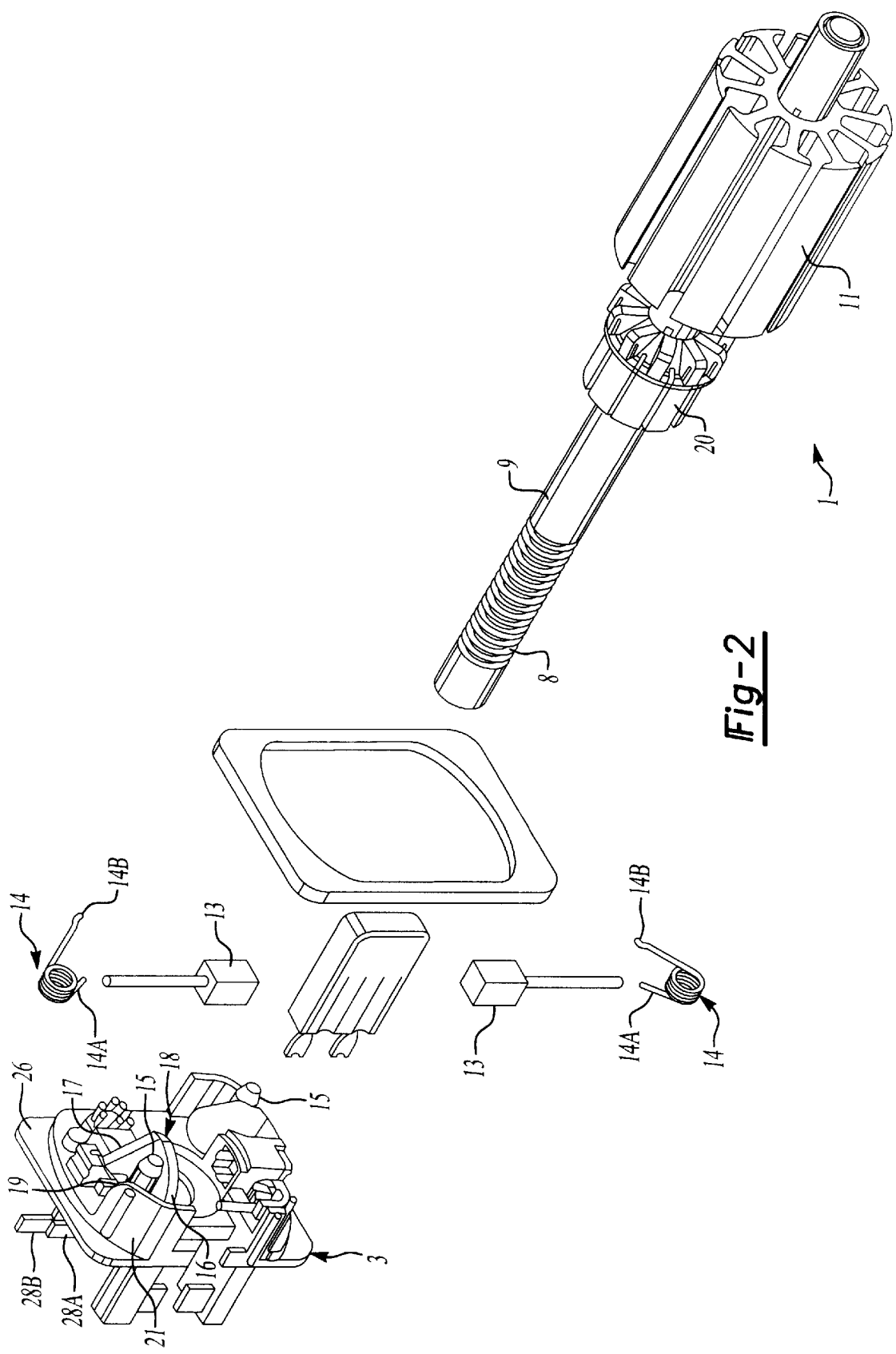
FIG. 2 is a partial exploded perspective view of the motorized reduction gear showing its slip-ring housing and its rotor.

Referring to FIG. 2, the rotor I supports a stack of laminations 11 concentric with the shaft 9 and a slip-ring 20 against which brushes 13 rub. The brushes 13 being pressed against the slip-ring 20 by respective springs 14.

Figure 3:
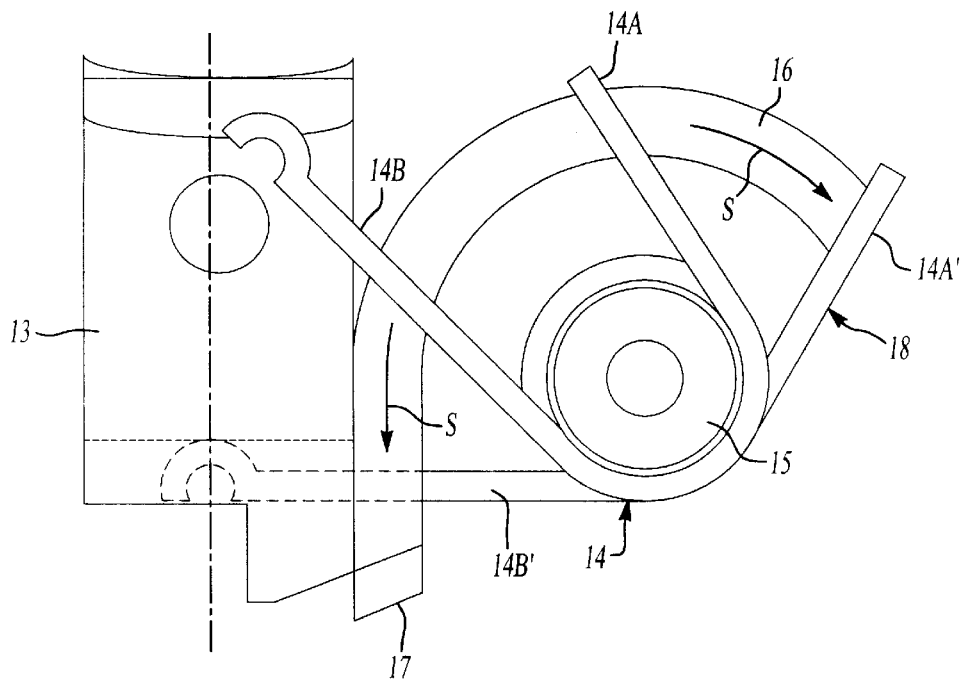
FIG. 3 is a partial plan view on a larger scale of a brush spring, of its guide ramps and of the associated brush.
Figure 4:
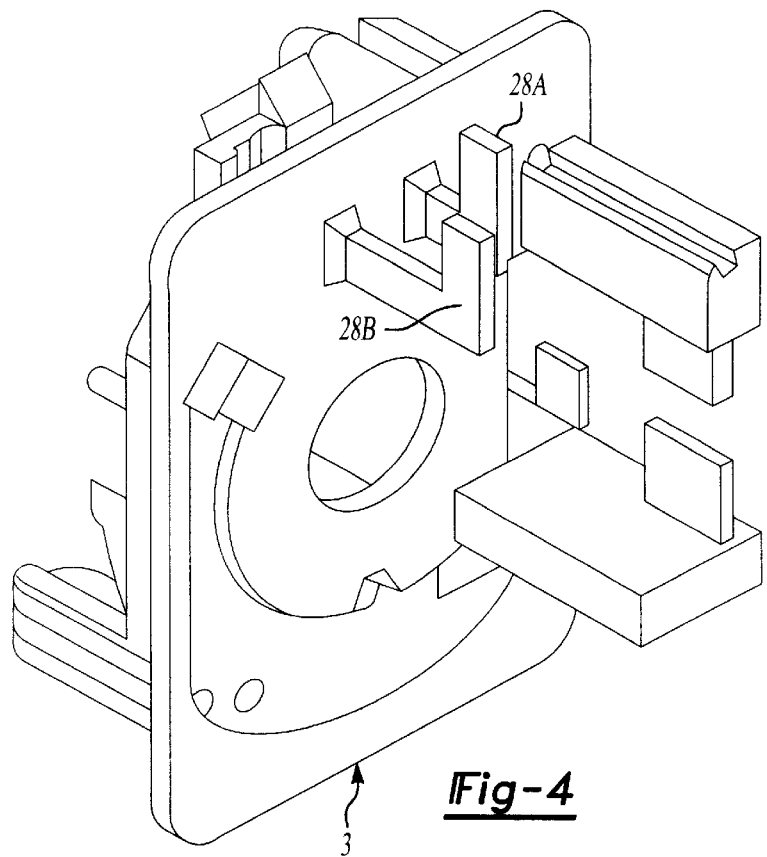
FIG. 4 is a perspective view from the rear in the direction K of the slip-ring housing of FIG. 2.

The slip-ring housing 3 includes two male electrical connections 28a, 28b clipped or force-fitted onto plastic supports 25 (not visible in FIGS. 2 and 3 but illustrated in FIGS. 6 and 7).

In FIGS. 1 and 2, connectors 28a, 28b and pivots 15 are arranged on each side of the plate 26 in the embodiment of FIGS. 1 and 2. With respect to FIGS. 6 and 7, connectors 28a, 28b and pivots 15 are arranged on the same side of plate 26. Connectors 28a, 28b are designed to fit into corresponding female electrical connections 32 (FIG. 1).

The connector assembly 4 is also equipped with elastic clipping tabs 11. Tabs 11 can be fitted elastically into corresponding shapes 12 once their projecting ends 11a have slid along a ramp 12 formed in a well 13 of the reduction gearbox 2. The end bosses 11a of the tabs 11 engage the transverse shapes 12 when the connector assembly 4 is fitted onto the box 2.

The slip-ring housing 3 is equipped with springs 14 each having two end branches 14a, 14b to keep the corresponding brushes 13 pressed against the slip-ring 20. The slip-ring housing 3 is also equipped with two pivots 15 to receive the springs 14, along inclined ramps 16, 17.

Ramps 16, 17 guide respective branches 14a, 14b of the associated spring 14 after fitting and sliding on the pivot 15 as far as its base. The ramps 16, 17 are preferably formed on a boss 18 of the slip-ring housing 3, which extends on each side of the associated pivot 15 and partially surrounds it.

Referring to FIG. 3, the spring 14 is compressed with its end branches 14a, 14b being pressed close together in the position of a hairpin. The spring 14 is then slid along the pivot 15 so that the branches 14a, 14b slide along the respective guide ramps 16, 17 and part, as indicated by the arrows S shown in FIG. 3, until reaching final position 14a' and 14b'. Arranged at the base of each of the ramps 16, 17 is a slit 19 that house and act as stops for the branches 14a, 14b of the spring 14 after the branches have been parted and guided along respective ramps 16, 17.

In the final position, the branches 14a and 14b are locked into respective stop slits 19. Slit 19 formed at the base of the ramp 17 can be seen, the other slit being hidden by a lateral protective cover 21 (FIG. 2). The branch end 14b exerting elastic force on the associated brush 13. The elastic force presses branch 14b onto slip ring 12, while the other branch 14a bears against the foot of the ramp 16.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. Assembly comprising a slip-ring housing and a connector assembly for a motorized reduction gear, said slip-ring housing comprising male electrical connections designed to fit into female electrical connections of said connector, said connector being fitted into a well of a reduction gearbox, said male connections clippable onto plastic supports, said connector assembly equipped with tabs for clipping elastically into corresponding shapes formed into a wall of said well of said reduction gearbox, said slip-ring housing providing a pivot for slidably receiving a spring having a first end branch and a second end branch, said first end branch acting on a corresponding brush to press said brush against said slip ring, and said housing equipped with an inclined ramp for guiding said spring to a final position such that said second end branch bears against a foot of said associated inclined ramp.

2. Assembly according to claim 1, wherein said two inclined ramps are formed adjacent a boss in said housing, said inclined ramps extending on each side of said associated pivot and a slit located at a base of said pivot for accommodating and acting as a stop for one of said branches of said spring once said spring has been fitted onto said pivot, and said branches have been guided along said respective ramps.

3. A motorized reduction gear assembly comprising:
   a reduction gearbox;
   a shaft having a slip ring;
   a slip-ring housing for supporting said shaft, said slip-ring housing fitted to said reduction gearbox, said slip ring housing having a pivot and an inclined ramp;
   a brush acting against said slip ring and supported by said slip-ring housing;
   a male electrical connector extending from said slip-ring housing;
   a connector assembly having a tab for clipping elastically into corresponding spaces formed into said reduction gearbox,
   a female electrical connection extending from said connector assembly for receipt of said male electrical connector; and
   a spring having a first and a second end branch, said spring fitted to said pivot such that said first end branch acts elastically on said brush and said second end branch acts elastically against said inclined ramp.

4. The motorized reduction gear assembly according to claim 3 wherein said second end branch fits into a slot in a boss adjacent said inclined ramp, said second end branch acting elastically against said boss and retained within said slot.

5. The motorized reduction gear assembly according to claim 3 wherein said inclined ramp acts as a guide for said spring when said spring is fitted to said pivot.

* * * * *